United States Patent [19]

Jung

[11] Patent Number: 5,896,361
[45] Date of Patent: Apr. 20, 1999

[54] MASTER DISK EXPOSURE DEVICE USING OPTICAL FIBER

[75] Inventor: Seung-tae Jung, Seongnam, Rep. of Korea

[73] Assignee: Samsung Electronics Co., Ltd., Kyungki-do, Rep. of Korea

[21] Appl. No.: 08/832,831

[22] Filed: Apr. 3, 1997

[51] Int. Cl.⁶ ..................................................... G11B 7/00
[52] U.S. Cl. .............................................. 369/112; 369/117
[58] Field of Search .................. 369/44.12, 44.23–44.24, 369/112, 117, 118, 121

[56] References Cited

U.S. PATENT DOCUMENTS

| | | | |
|---|---|---|---|
| 5,033,043 | 7/1991 | Hayakawa | 369/121 |
| 5,351,229 | 9/1994 | Brezoczky et al. | 369/99 |
| 5,475,518 | 12/1995 | Karaki | 369/117 X |
| 5,680,381 | 10/1997 | Horimai | 369/117 X |

FOREIGN PATENT DOCUMENTS

| | | |
|---|---|---|
| 1 526 333 | 9/1978 | United Kingdom . |
| 2 067 300 | 7/1981 | United Kingdom . |

OTHER PUBLICATIONS

Valaskovic et al., "Parameter control, characterization, and optimization in the fabrication of optical fiber near-field probes", Applied Optics, vol. 34, No. 7, Mar. 1, 1995, pp. 1215–1228.

Primary Examiner—W. R. Young
Attorney, Agent, or Firm—Sughrue, Mion, Zinn, Macpeak & Seas, PLLC

[57] ABSTRACT

A master disk exposure device capable of projecting varying sized laser beams on a master disk, includes a slider for moving an optical fiber in a radial direction along the surface of a master disk. The optical fiber projects a beam emitted by a beam generator. The beam is passed through a shutter intermittently before being focussed by a focus lens once focused the beam is projected by the optical fiber onto the recording surface of the master disk.

17 Claims, 5 Drawing Sheets

MASTER DISK EXPOSURE DEVICE USING OPTICAL FIBER

BACKGROUND OF THE INVENTION

The present invention relates to an optical disk exposure device, and more particularly, to a device for exposing a photoresist layer coated on a master disk of a stamper which is a mold for manufacturing optical disks, using optical fibers.

Various kinds of recording media are classified by the recording and reproducing methods used. In an optical recording and reproducing method using a laser beam, a laser beam is projected onto a signal surface comprised by pits arranged in a spiral on a surface of an optical disk, and reflected from the signal surface according to an optical signal, to thereby record and reproduce information. The optical disk is made of a transparent resin material such as polymethylmethacrylate or polycarbonate, and includes a transparent substrate having an information recording surface of pits of a predetermined pattern, a reflection film formed by coating a metal on the transparent substrate by deposition or sputtering, and a protection film formed on the reflection film.

The transparent substrate of the optical disk is manufactured by injection-molding, using a mold called a stamper having the same patterns as the pit patterns. The stamper includes a master disk having a photoresist layer of the same patterns as the pit patterns formed on the information recording layer of the transparent substrate thereon, and a nickel film coated to a predetermined thickness on the upper surface of the photoresist layer.

In manufacturing such a stamper, a conventional exposure device shown in FIG. 1 is used to form pits of a predetermined pattern on the photoresist layer.

Referring to FIG. 1, a laser beam projected from a laser beam source 23 is selectively passed or blocked by a shutter 24. Then, the laser beam passing the shutter 24 is reflected toward an object lens 21 by a dichroic filter 22, and the reflected beam is focused in the object lens 21 to reach a photoresist layer 12. In this manner, the photoresist layer 12 formed on the upper surface of the master disk 11 is exposed to the laser beam in a predetermined pattern.

During exposure of the photoresist layer 12, the laser beam is focused as follows. The laser beam generated in a focus correcting laser beam source 26 reaches the photoresist layer 12 of the master disk 11 through a half mirror 25, the dichroic filter 22, and the object lens 21. The beam reflected from the photoresist layer 12 is projected back to a focus correcting optical means 27. When the beam is projected to the focus correcting optical means 27, an electrical signal is generated. An actuator (not shown) of the object lens 21 is driven by this electrical signal, thereby correcting the focus.

When the photoresist layer 12 of the master disk 11 is exposed to the laser beam as described above, a nickel plated film is formed on the upper surface of the photoresist layer 12, thereby obtaining a stamper.

However, a problem with the conventional exposure device is that the device is expensive and complicated due to the need for a precise optical system for correcting the focus of a laser beam. Another problem is that since the laser beam is focused by the object lens thereby limiting the degree to which the size of the spot of the beam can be decreased, the recording density of the master disk cannot be increased.

SUMMARY OF THE INVENTION

To solve the above problems, the object of the present invention is to provide a master disk exposure device for increasing a recording density by decreasing the size of a laser beam spot, using optical fibers.

In the present invention, a beam emitted from a beam generating means is projected on a recording surface of a master disk through an optical fiber. The optical fiber is fixed by an adhesive in a through hole of a slider, slidable in a radial direction of the master disk by a transferring means. A beam emitted from the beam generating means is selectively blocked by or passed through a shutter which is controlled by a control means according to a predetermined signal and focused by a focus lens, before reaching the optical fiber. A coating film having a 1 μm hole, or smaller, is preferably formed on the surface of the tip of the optical fiber. Since a beam is projected through this hole, exposure of very fine pit patterns can be formed.

According to another embodiment of the present invention, the slider has at least two optical fibers spaced from each other by a predetermined distance. The master disk exposure device further comprises diverging means for diverging the beam emitted from the beam generating means to the optical fibers, respectively. Here, one beam intermittently blocked by the shutter is incident on one of the optical fibers, and the other non-blocked beam, i.e., the continuously passing beam, is incident on the other optical fiber. Thus, pit and groove patterns of the master disk can be formed simultaneously.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
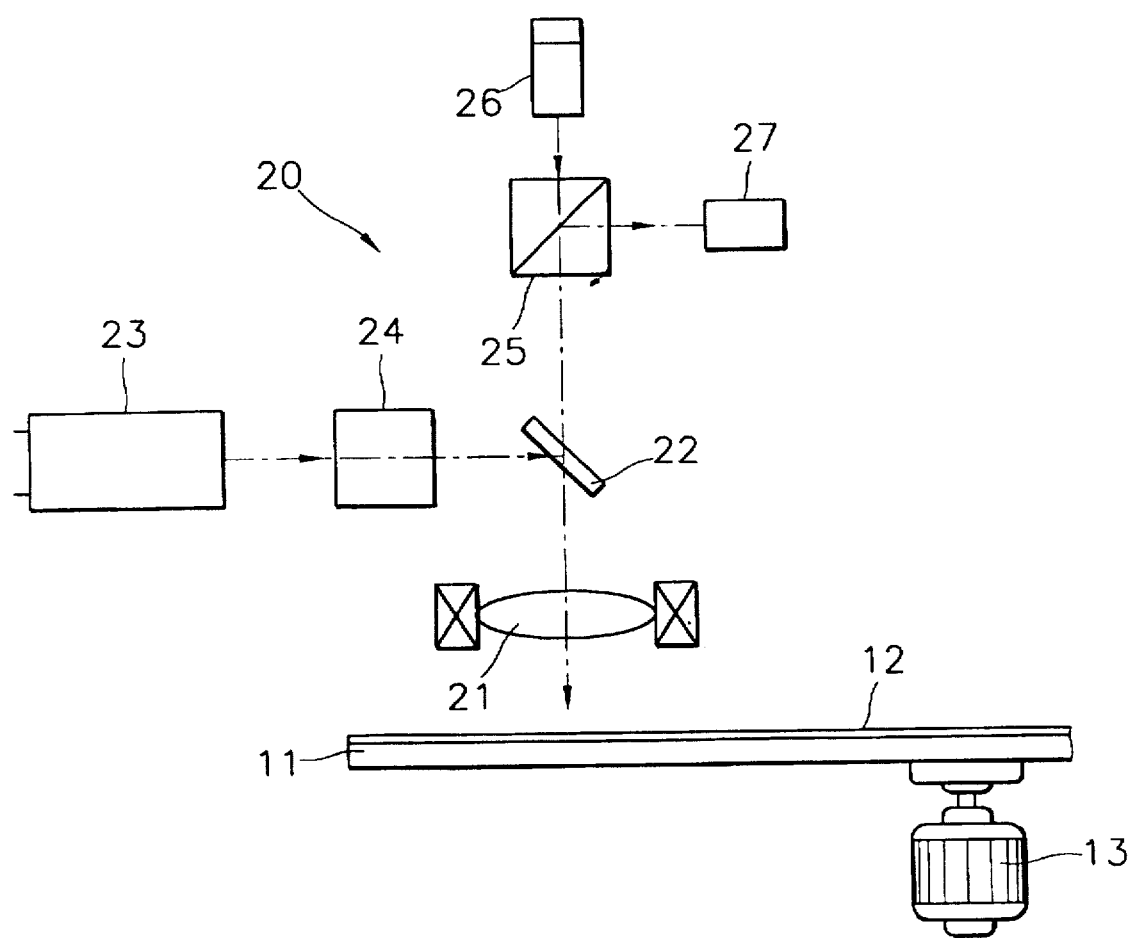
FIG. 1 is a side view of a conventional master disk exposure device.
Figure 2:
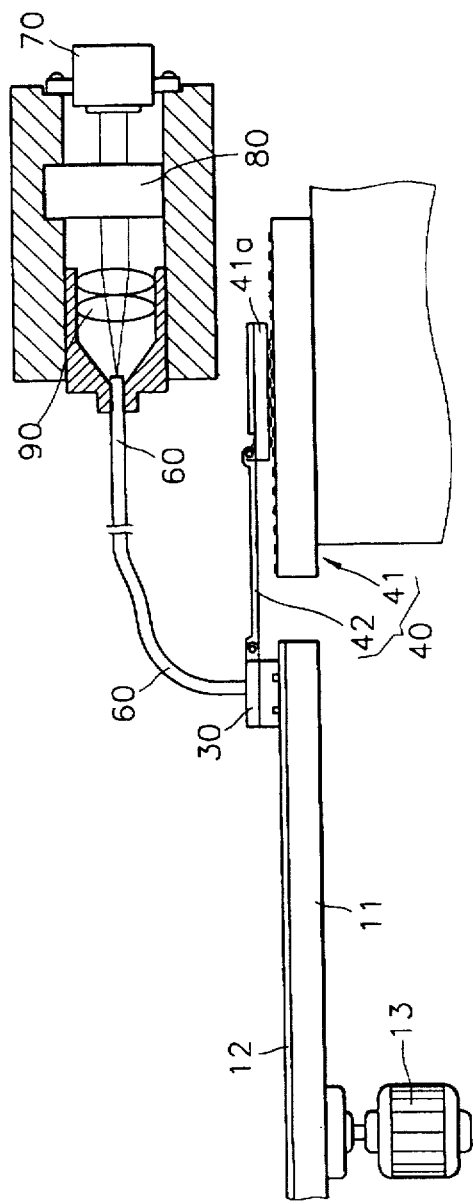
FIG. 2 is a side view of a master disk exposure device using an optical fiber according to an embodiment of the present invention.

Referring to FIG. 2, the master disk exposure device of the present invention includes a slider 30 adjacent to or contacting a photoresist layer 12 being a recording surface formed on a master disk 11 which is rotated by a driving motor 13, a transferring means 40 for transferring the slider 30 in a radial direction of the master disk 11, an optical fiber 60 having an end portion fixed to the slider 30 for projecting a beam on the upper surface of the photoresist layer 12, a beam source 70 for generating a beam to expose the photoresist layer 12, and a shutter 80 for allowing the beam generated from the beam source 70 to selectively pass or be blocked, controlled by a predetermined signal of a controller (not shown). A group of focus lenses 90 are installed in front of the shutter 80 for focusing the beam emitted from the beam source 70 on the other end portion of the optical fiber 60.

Figure 3:
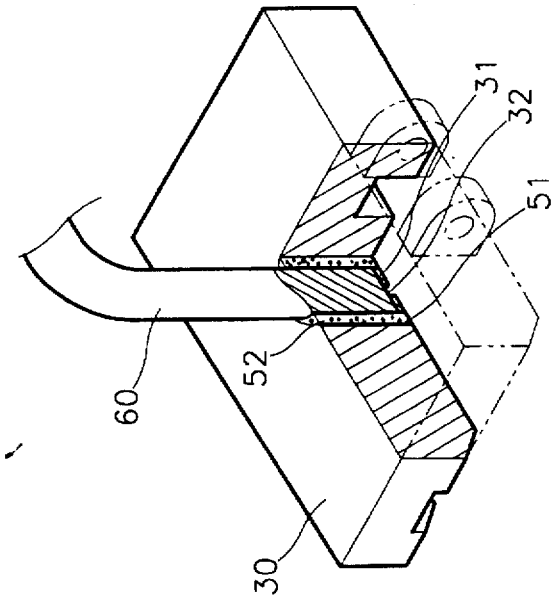
FIG. 3 is a partially cut-out sectional perspective view of an optical fiber fixed to the slider of FIG. 2.

As shown in FIG. 3, a through hole 51 is formed in the slider 30, and an end portion of the optical fiber 60 is inserted into the through hole 51 to be fixed by an adhesive 52. The adhesive 52 is preferably a resin hardened by ultra violet rays. A coating film 31 is formed of a metal such as gold on the tip of the optical fiber 60, and has a hole 32 of about 1 µm or less in diameter corresponding to the center of the optical fiber 60. Such a tiny hole 32 can be manufactured by focusing a short-wave laser beam with a lens having a high aperture.

Figure 4:
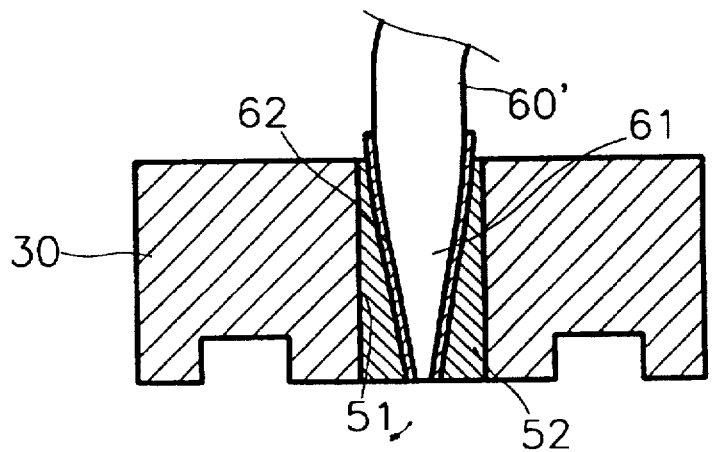
FIG. 4 is a sectional view of another embodiment of the optical fiber combined with the slider.
Figure 5:
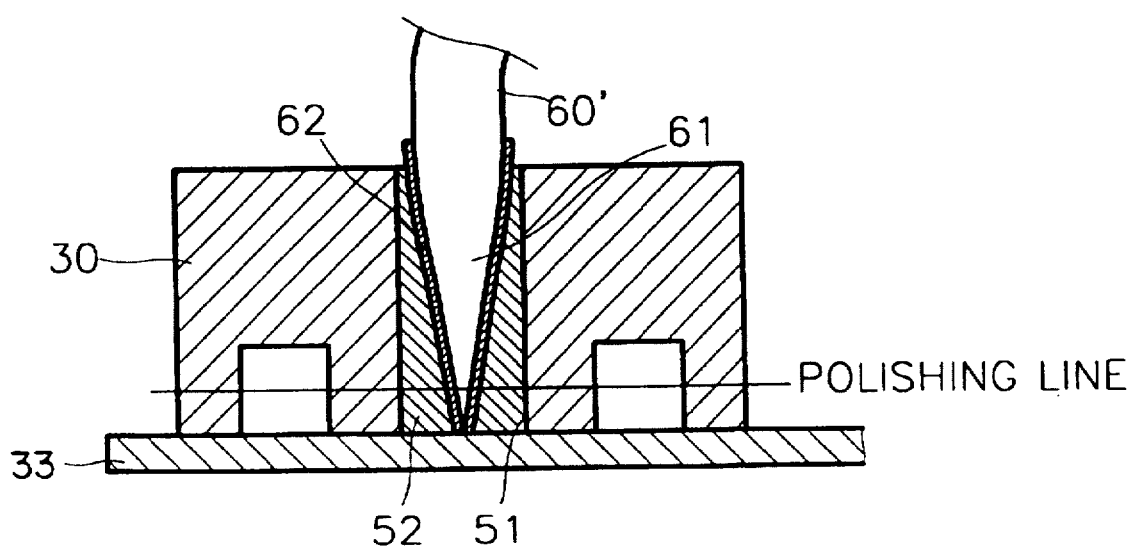
FIG. 5 is a sectional view for explaining the manufacturing process of the slider and optical fiber shown in FIG. 4.

Referring to FIG. 4 showing another embodiment of the optical fiber adopted in the present invention, a tapered portion 61 is formed on an end portion of an optical fiber 60' so that the sectional area at the tip of the optical fiber 60' is smaller than that at the other portions thereof. A metal coating film 62 is formed of gold or aluminum on the outer circumferential surface of the tapered portion 61. The combination of the slider 30 and the optical fiber 60' according to this embodiment will be described as follows, with reference to FIG. 5. First, the slider 30 having the through hole 51 is placed on a flat and wide base 33. Then, the optical fiber 60' having the tapered portion 61 is inserted into the through hole 51 until the tip of the optical fiber 60' makes contact with the upper surface of the base 33. Then, the adhesive 52 such as an ultra violet hardening resin is injected into the through hole 51 and hardened. When the optical fiber 60' is completely fixed in the through hole 51, the lower surface of the slider 30 is polished, for example, up to a dashed line shown. Here, the section area of the tip of the optical fiber 60' can be controlled by controlling the polished depth. According to this embodiment, there is no need to form the coating film 31 of FIG. 3 having the tiny hole 32.

Referring to FIG. 2, the transferring means 40 for transferring the slider 30 in a radial direction of the master disk 11 includes a linear step motor 41, and a connection member 42 connected to an inductor 41a of the linear step motor 41 and the slider 30 by hinges.

The beam source 70 (e.g., an argon (Ar) or krypton (Kr) laser diode) generates a beam for exposing the photoresist layer 12 formed on the upper surface of the master disk 11.

The above described disk exposure device using an optical fiber according to the present invention operates as follows.

The master disk 11 is rotated by the driving motor 13, while the slider 30 is in contact with the upper surface of the photoresist layer 12 of the master disk 11. A beam is emitted from the beam source 70, blocked by or passed through the shutter 80 driven according to a predetermined signal. The beam having passed through the shutter 80 is focused by the group of focus lenses 90, and reaches the optical fiber 60. The beam travels through the optical fiber 60 and is emitted from the tip of the optical fiber 60. Then, the beam is transmitted through the hole 32 of the coating film 31 and impinges on the photoresist layer 12. Here, since the light emitted from the beam source 70 is intermittently blocked by the shutter 80, it exposes the photoresist layer intermittently. At this time, the slider 30 is transferred along a radial direction of the master disk 11 by the linear step motor 41. Therefore, the photoresist layer 12 is exposed in a spiral in the same pattern as the pit pattern described earlier.

Similar to a magnetic head slider in a hard disk driver of a computer, the slider 30 levitates about 0.1 µm above the master disk 11 due to the adhesive forces of the master disk 11 and the air flow above the upper surface of the master disk 11. Therefore, the laser beam projected on the disk 11 through the hole 32 of the coating film 31 formed on the tip of the optical fiber 60 reaches the recording surface of the disk 11 with the same diameter as that of the hole 32, thus varying the optical property of the recording film and recording information.

Figure 6:
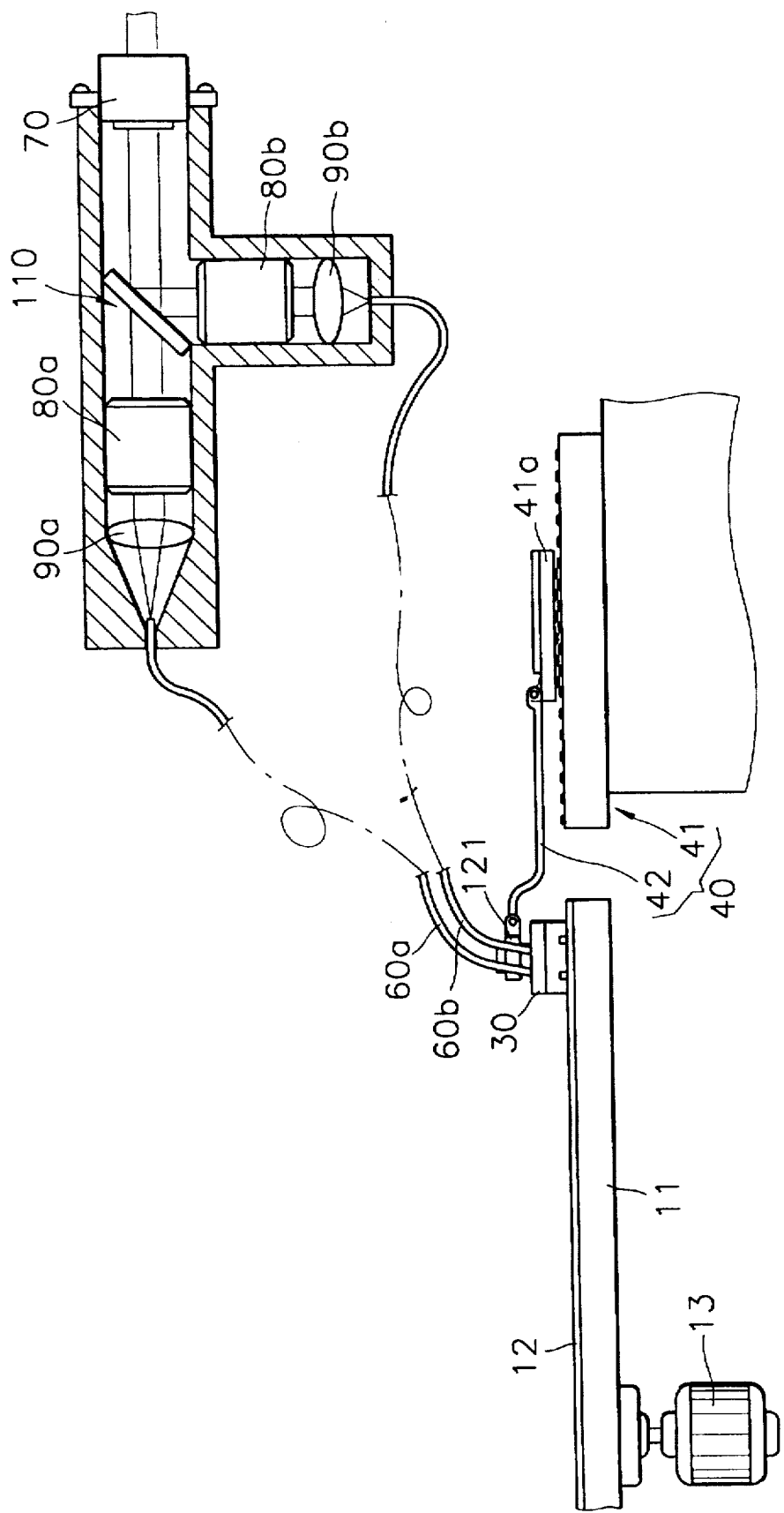
FIG. 6 is a side view of a master disk exposure device using an optical fiber according to still another embodiment of the present invention.

FIG. 6 illustrates a master disk exposure device using an optical fiber according to still another embodiment of the present invention. Here, like reference numerals denote the same components as those in the previous drawings. According to this embodiment, at least two optical fibers 60a and 60b are provided to the slider 30. The end portions of the optical fibers 60a and 60b are fixed to the slider 30 in the same manner as described above.

There is a diverging means 110 for diverging a beam emitted from the beam source 70, shutters 80a and 80b for allowing the beam transmitted through the diverging means 110 to be passed or be blocked, and focus lenses 90a and 90b for focusing the beams passing through the shutters 80a and 80b, which are sequentially installed between the optical fibers 60a and 60b and the beam source 70. The diverging means 110 is preferably a beam splitter installed along the optical path. Alternatively, though not shown in the drawing, the optical fibers 60a and 60b each have a beam source, a shutter, and a focus lens.

Figure 7:
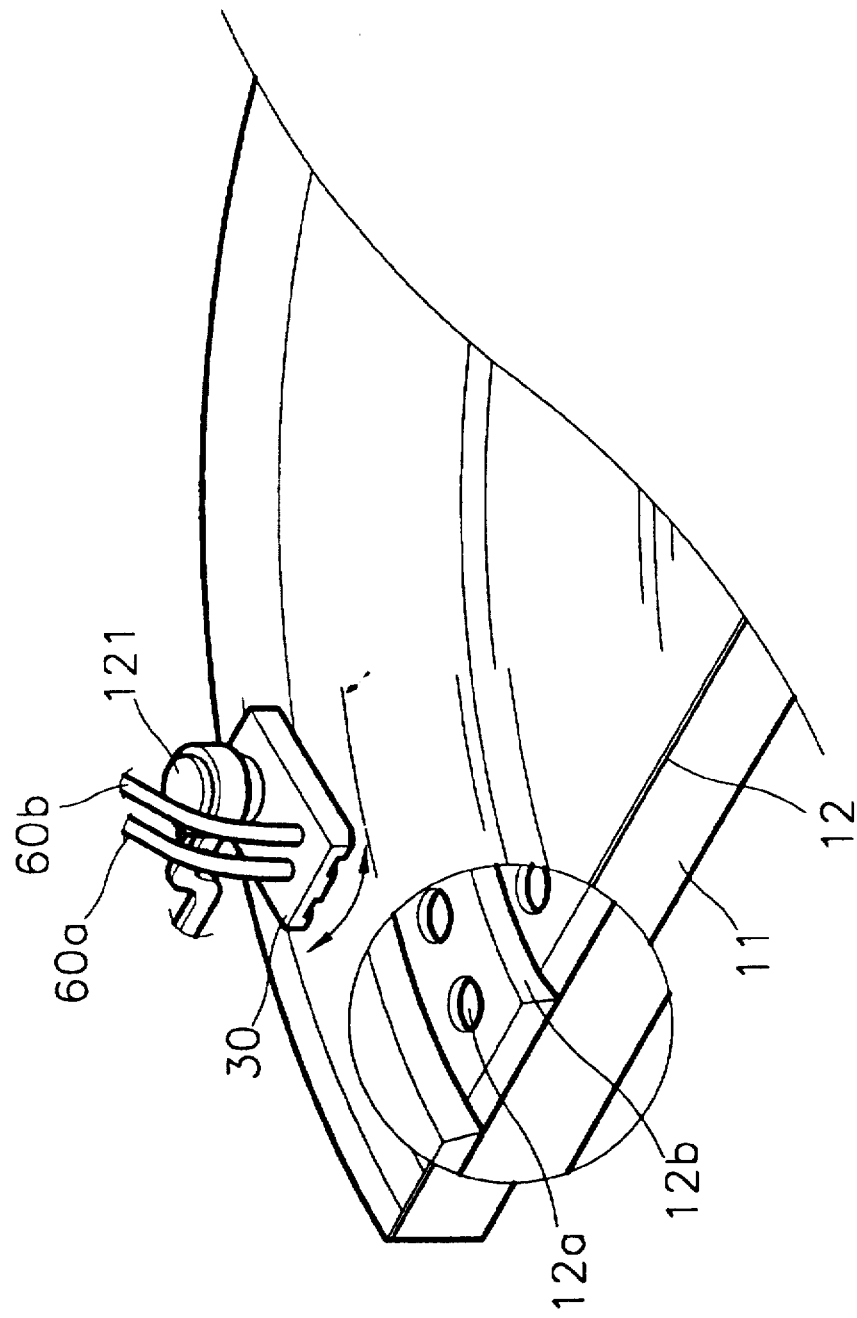
FIG. 7 is a partial section perspective view for explaining adjustment of the distance between a pit and a groove, using the angle controller shown in FIG. 6.

In addition, as shown in FIG. 7, an angle controller 121 is installed on the slider 30, for rotating the slider 30 a predetermined number of degrees, and combined with an end portion of the connection member 52 by a hinge.

In the operation of the master disk exposure device according to this embodiment, a beam emitted from the beam source 70 of FIG. 6 is diverged by the diverging means 110. The diverged beams are intermittently blocked by or passed through the shutters 80a and 80b, focused by the focus lenses 90a and 90b, and transferred to the optical fibers 60a and 60b, respectively. The transferred beam travels through the optical fibers 60a and 60b, respectively, and are emitted from the tips of the optical fibers 60a and 60b, thereby exposing the photoresist layer 12.

According to the present embodiment, as shown in FIG. 7, pits 12a and grooves 12b of the master disk 11 can be simultaneously formed. That is, a beam transferred to the optical fiber 60a for forming the pit 12a is intermittently blocked by the shutter 80a, while a beam transferred to the optical fiber 60b for forming the groove 12b continues to travel without being blocked by the shutter 80b.

In addition, the distance between the pit 12a and the groove 12b can be controlled by adjusting the rotating angle of the slider 30 by a step motor (not shown) installed in the angle controller 121.

The photoresist layer 12 is completed once a predetermined pit pattern has been formed. Then, nickel is plated on the upper surface of the pit pattern of the photoresist layer 12, thereby manufacturing a stamper.

As described above in the present invention, since the diameter of the projection of a laser beam can be decreased, fine pit patterns can be formed, thereby providing high density recording. In addition, the present invention is simple in structure since it obviates the need for a device for adjusting the focus length of a laser beam, in contrast to the prior art.

The present invention is not limited to the above embodiments, and it is clearly understood that many variations are possible within the scope and spirit of the present invention by anyone skilled in the art.

What is claimed is:

1. A master disk exposure device comprising:

a slider for moving on a recording surface of a master disk in a radial direction of said master disk;

means for transferring said slider;

means for generating a beam;

a shutter for allowing said beam emitted from said beam generating means to be intermittently blocked or pass;

an optical fiber having a first end portion thereof fixed to said slider for projecting the beam emitted from said beam generating means onto the recording surface of the master disk; and a focus lens installed between said shutter and a second end portion of said optical fiber for focusing said beam having passed through said shutter.

2. A master disk exposure device as claimed in claim 1, wherein a through hole is formed in said slider and said optical fiber is inserted in said through hole and fixed by an adhesive.

3. A master disk exposure device as claimed in claim 2, wherein said adhesive is an ultra violet hardening resin.

4. A master disk exposure device as claimed in claim 2, wherein a coating film having a hole is formed on the surface of the first end portion of said optical fiber.

5. A master disk exposure device as claimed in claim 4, wherein a diameter of said hole is about 1 µm or less.

6. A master disk exposure device as claimed in claim 2, wherein a tapered portion is formed at the first end portion of said optical fiber so that a sectional area of a tip of said optical fiber is smaller than the remaining portions thereof.

7. A master disk exposure device as claimed in claim 6, wherein a metal film is coated on an outer circumferential surface of said tapered portion of said optical fiber.

8. A master disk exposure device comprising:

a slider for moving on a recording surface of a master disk in a radial direction of said master disk;

means for transferring said slider;

first and second means for generating a beam;

first and second shutters for allowing said beam emitted from said first and second beam generating means to be intermittently blocked or passed, respectively;

first and second optical fibers each having a first end portion thereof fixed to said slider for projecting beams emitted from said first and second beam generating means onto the recording surface of the master disk; and first and second focus lenses installed between said first shutter and a second end portion of said first optical fiber, and said second shutter and a second end portion of said second optical fiber, respectively, for focusing said beams having passed through said first and second shutters.

9. A master disk exposure device as claimed in claim 8, further comprising diverging means for diverging a beam emitted from said beam generating means to be transferred to each of said optical fibers.

10. A master disk exposure device as claimed in claim 9, further comprising an angle controller for rotating said slider at a predetermined angle.

11. A master disk exposure device as claimed in claim 8, wherein a beam to be transmitted to said first optical fiber is intermittently blocked by said first shutter, and a beam to be transmitted to said second optical fiber is not blocked by said second shutter.

12. A master disk exposure device as claimed in claim 8, wherein said slider has through holes and said optical fibers are inserted in said through holes and fixed by an adhesive.

13. A master disk exposure device as claimed in claim 12, wherein said adhesive is an ultra violet hardening resin.

14. A master disk exposure device as claimed in claim 12, wherein a coating film having a hole is formed on a surface of the first end portions of said optical fibers.

15. A master disk exposure device as claimed in claim 14, wherein a diameter of said hole is about 1 µm or less.

16. A master disk exposure device as claimed in claim 12, wherein a tapered portion is formed on each respective first end portion of said optical fibers so that the sectional area of the tip of said optical fibers is smaller than the remaining portions thereof.

17. A master disk exposure device as claimed in claim 16, wherein a metal film is coated on each respective outer circumferential surface of said tapered portion of said optical fibers.

* * * * *